(12) United States Patent
Wang et al.

(10) Patent No.: US 11,352,945 B1
(45) Date of Patent: Jun. 7, 2022

(54) PUSH-TO-CONNECT CRANK AND LINKAGE ASSEMBLY FOR A TURBOCHARGER, AND ASSOCIATED ASSEMBLY METHOD

(71) Applicant: Garrett Transportation I Inc., Torrance, CA (US)

(72) Inventors: Huan Wang, Shanghai (CN); Yunbin Gong, Shanghai (CN); Xiaolei Jin, Shanghai (CN); Jinjiang Shao, Shanghai (CN)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/304,551

(22) Filed: Jun. 23, 2021

(51) Int. Cl.
*F02B 37/18* (2006.01)

(52) U.S. Cl.
CPC ........ *F02B 37/186* (2013.01); *F05D 2220/40* (2013.01)

(58) Field of Classification Search
CPC ........................... F02B 37/186; F05D 2220/40
See application file for complete search history.

(56) References Cited

U.S. PATENT DOCUMENTS

2018/0223727 A1* 8/2018 Nakajima ............. F02B 37/186

* cited by examiner

*Primary Examiner* — Audrey B. Walter
*Assistant Examiner* — Edward Bushard
(74) *Attorney, Agent, or Firm* — John C. James

(57) ABSTRACT

A crank and linkage assembly for a component of a turbocharger includes a linkage having an end defining a through bore, an inner surface of the through bore defining a linkage groove therein. The crank has a pin whose outer surface defines a pin groove. A generally polygonal retaining ring of elastically deformable wire is installed partially in the linkage groove and partially in the pin groove to retain the linkage on the pin while allowing the linkage to rotate about the pin axis. Vertices of the retaining ring are in the linkage groove, while sides of the retaining ring are in the pin groove. Once the retaining ring is pre-installed in the linkage groove, the assembly can be assembled by a push-to-connect process.

10 Claims, 9 Drawing Sheets

PUSH-TO-CONNECT CRANK AND LINKAGE ASSEMBLY FOR A TURBOCHARGER, AND ASSOCIATED ASSEMBLY METHOD

BACKGROUND OF THE INVENTION

This application relates generally to turbochargers for internal combustion engines, and relates more particularly to a crank and linkage assembly for connecting between an actuator and an adjustable component such as a waste gate valve or the like.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas, which is then discharged into an exhaust conduit that may be connected to further treatment devices such as a catalytic device and/or sound-attenuating muffler. The turbine thus extracts power from the exhaust gas and drives the compressor. The compressor receives ambient air through an inlet of the compressor housing and the air is compressed by the compressor wheel and is then discharged from the housing to the engine air intake.

The turbine of the turbocharger typically includes a valve (often called a waste gate valve) arranged in the turbine housing in a location such that opening the valve causes the majority of exhaust gases coming from the engine to bypass the turbine wheel and proceed directly into the exhaust conduit. The waste gate valve enables the power-extraction of the turbine to be controlled, thereby controlling the amount of boost provided by the compressor. Thus, the waste gate valve can be either closed, partially opened to various degrees, or fully open, depending upon the operating condition of the engine and the amount of boost desired from the turbocharger.

The waste gate valve is typically actuated by a rotary actuator whose output shaft is connected to a crank. The actuator crank is rotatably coupled to one end of a linkage, and the opposite end of the linkage is rotatably coupled to a crank affixed to the valve member shaft of the waste gate valve. The coupling of the ends of the linkage to the cranks is usually accomplished by a pin and retaining clip arrangement. Thus, the crank has a pin projecting therefrom, and the outer surface of the pin near the distal end thereof defines a circular groove encircling the pin. The linkage defines a through-bore that receives the pin. A generally C-shaped or E-shaped retaining clip (often called a circlip or e-ring) is snapped into the circular groove to capture the linkage and prevent it from being removed from the pin.

There are drawbacks to this conventional linkage and crank assembly. One issue is that unless additional components such as a wave spring are added to the assembly, the linkage is subject to excessive play in the direction parallel to the axis of the pin. A wave spring or the like can reduce the play, but this solution comes with additional cost and parts count. Additionally, the retaining clip can be subject to stress corrosion cracking, which can cause the clip to break and compromise the integrity of the linkage-to-crank connection.

SUMMARY OF THE DISCLOSURE

The present disclosure describes a crank and linkage assembly for a turbocharger that can mitigate or eliminate the drawbacks noted above, and achieve further advantages noted herein. In particular, the disclosed assembly can simplify the assembly process by facilitating a push-to-connect process between the linkage and the pin of the crank.

In accordance with one embodiment disclosed herein, a crank is provided having a cylindrical pin extending therefrom along a pin axis and terminating at a distal end of the pin. An outer surface of the pin defines a circular pin groove therein encircling the pin axis, the pin groove being spaced along the pin axis from the crank. The pin, distal of the pin groove, comprises a tapered end. A linkage is provided, comprising an elongate member, the linkage defining a through bore adjacent an end of the linkage, an inner surface of the through bore defining a circular linkage groove therein. To connect the linkage to the pin of the crank, there is provided a retaining ring comprising an elastically deformable wire formed into a generally polygonal non-closed configuration (i.e., having a gap between the two ends of the wire) such that the retaining ring defines a plurality of vertices and a plurality of sides. The retaining ring optionally can have three vertices and two sides, three vertices and three sides, four vertices and three sides, four vertices and four sides, five vertices and four sides, etc.

The retaining ring is installed in the linkage groove such that each of said plurality of vertices is within the linkage groove. The linkage can be assembled with the crank by pushing it onto the pin. Thus, the tapered end of the pin is inserted into the through bore of the linkage to cause the tapered end to elastically deform the sides of the retaining ring radially outwardly. Once the pin groove is aligned with the linkage groove, the sides of the retaining ring move radially inwardly, by elastic restoring force of the wire, and at least two of the sides have portions that engage the pin groove. The retaining ring restrains movement of the linkage along the pin axis, while allowing the linkage to rotate relative to the pin about the pin axis.

BRIEF DESCRIPTION OF THE DRAWINGS

Having described the present disclosure in general terms, reference will now be made to the accompanying drawing(s), which are not necessarily drawn to scale, and wherein:

FIG. 4D' shows a cross-section of a wire in accordance with an alternative embodiment of the invention;

FIG. 4D" shows a cross-section of a wire in accordance with a further alternative embodiment of the invention;

DETAILED DESCRIPTION OF THE DRAWINGS

The present disclosure will now be described in fuller detail with reference to the above-described drawings, which depict some but not all embodiments of the invention (s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
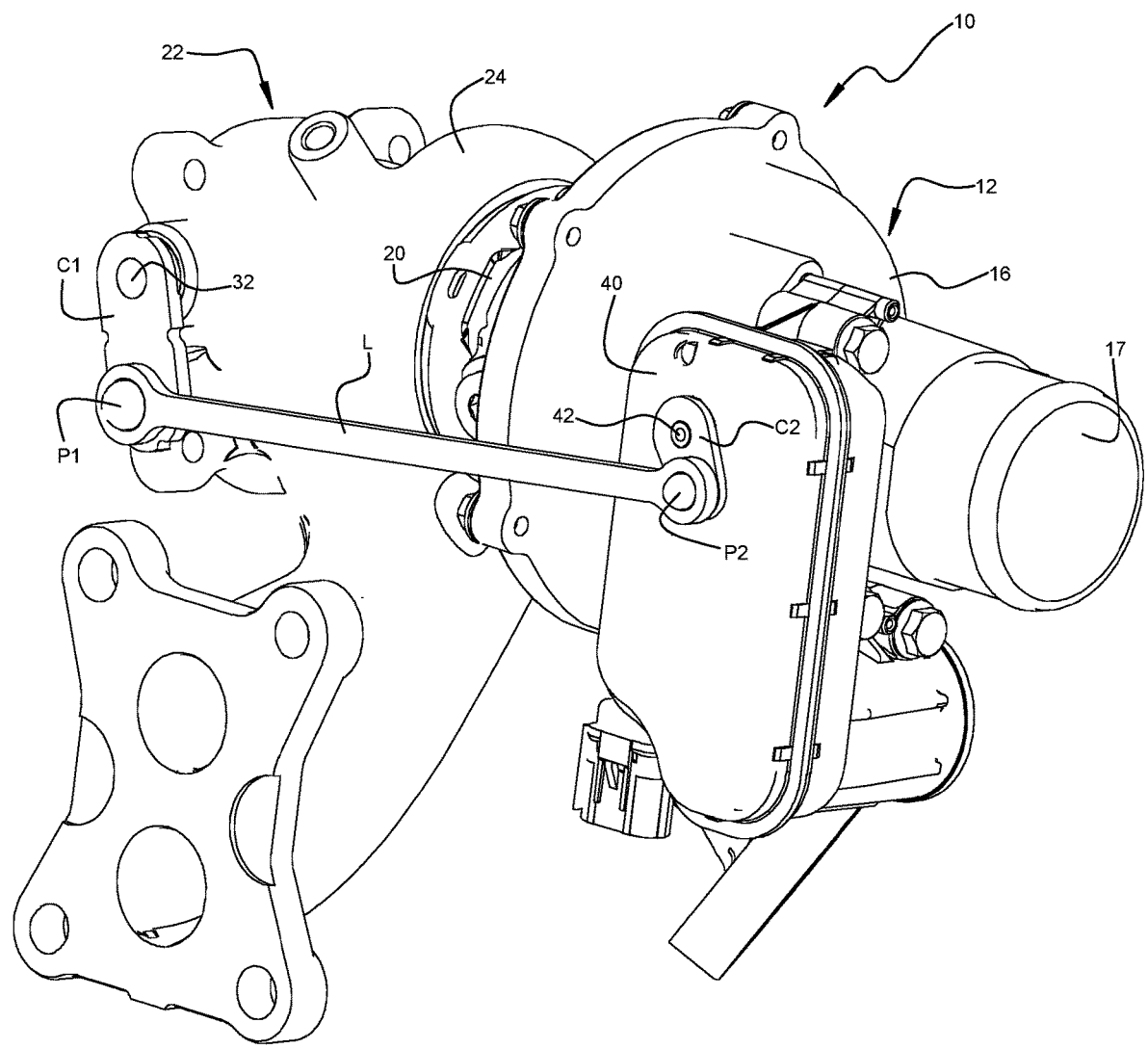
FIG. 1 is an isometric view of a turbocharger in accordance with an embodiment of the invention.
Figure 2:
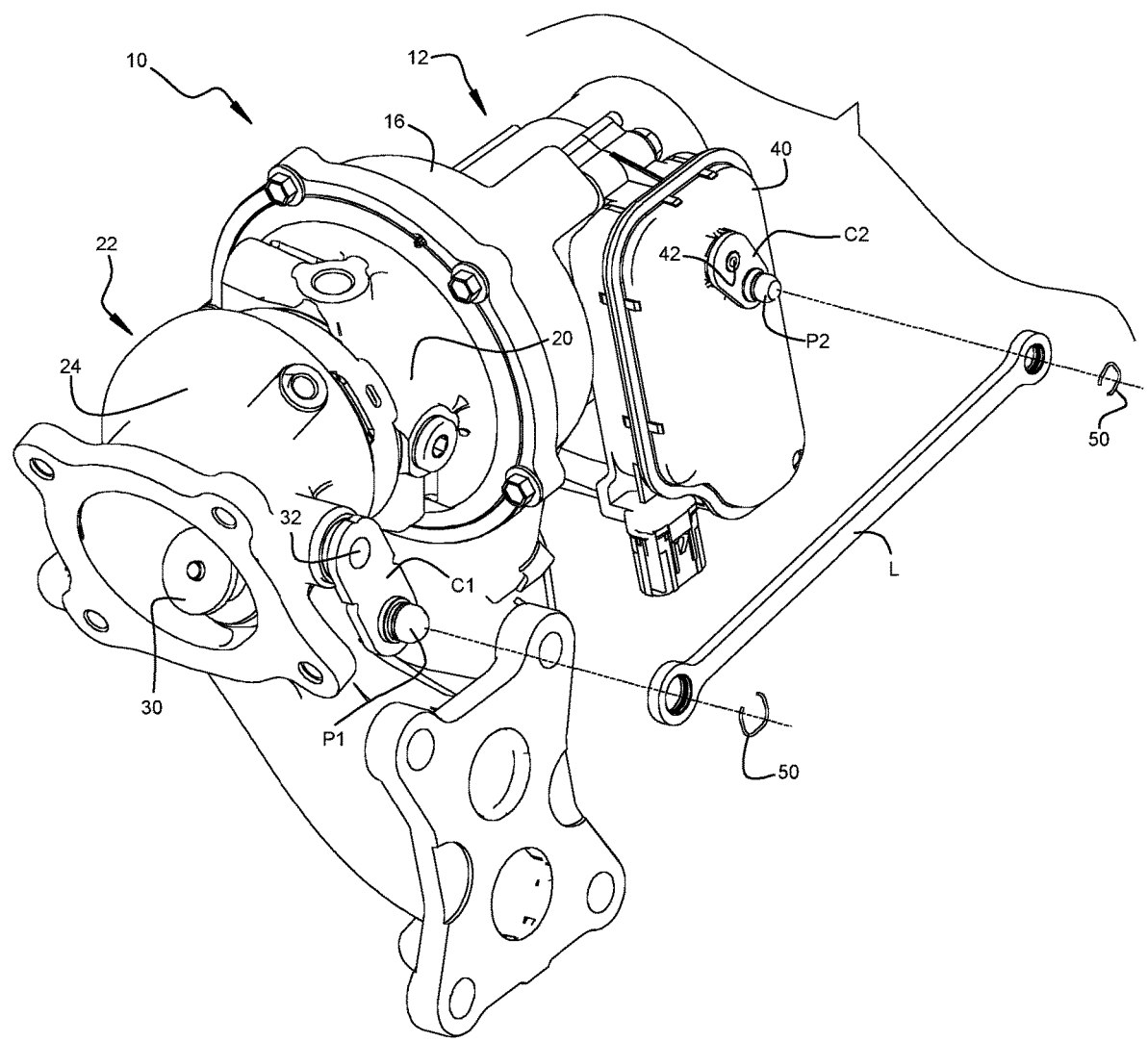
FIG. 2 is an exploded view of the turbocharger of FIG. 1, showing the linkage and retaining rings exploded away from the cranks for the actuator and waste gate valve.
Figure 3:
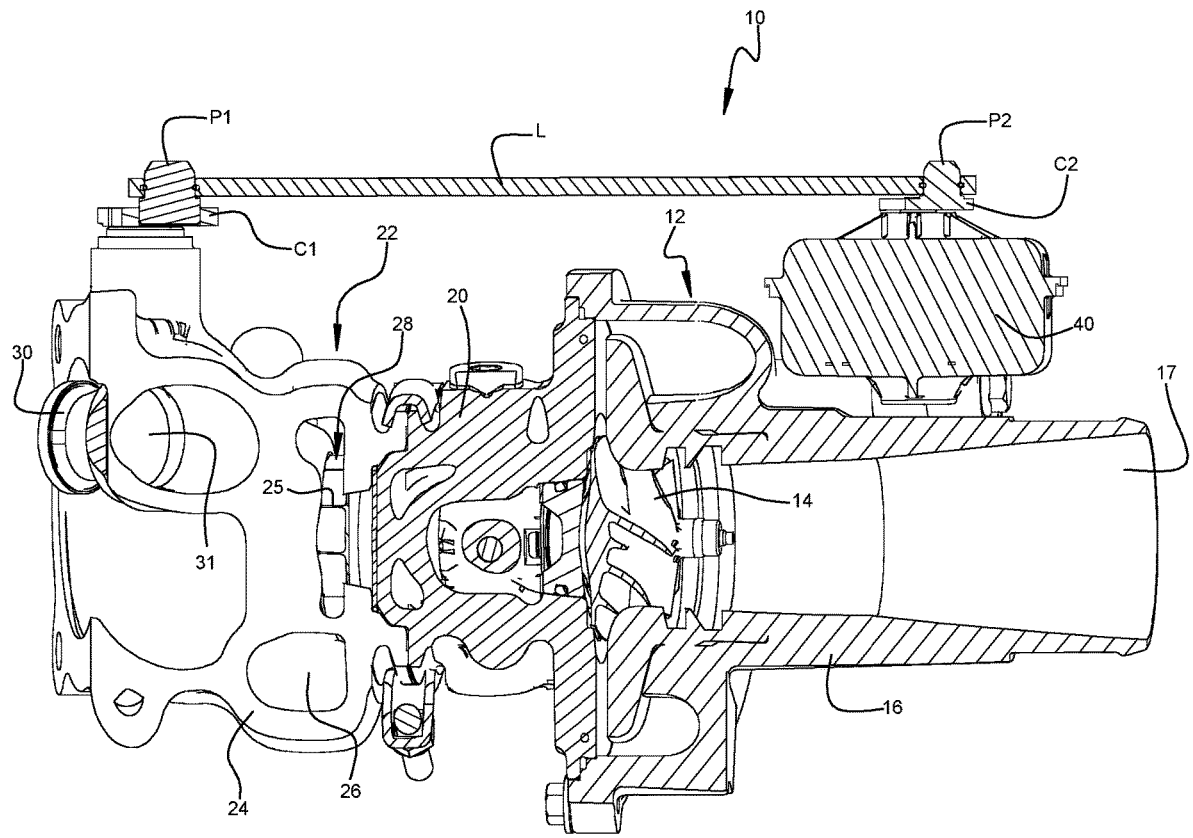
FIG. 3 is a cross-sectional view through the turbocharger of FIG. 1 along a plane that contains the pin axes of the two cranks.

FIGS. 1-3 illustrate a turbocharger 10 in accordance with an embodiment of the invention. The turbocharger comprises a compressor 12 having a compressor wheel 14 mounted within a compressor housing 16 defining an air inlet 17 for the compressor, and a turbine 22 comprising a turbine wheel 25 (FIG. 3) mounted within a turbine housing 24 and connected to a shaft (not visible) that also connects with the compressor wheel. A center housing 20 is disposed between and secured to the compressor housing and turbine housing, and contains bearings for the shaft.

The turbine housing 24 defines an annular chamber 26 surrounding the turbine wheel 25 for receiving exhaust gas from an internal combustion engine (not shown). Exhaust gas is directed from the chamber via a turbine nozzle 28 onto the turbine wheel. In some operating conditions, it is desirable to cause some of the exhaust gas to bypass the turbine wheel and proceed directly into the downstream exhaust conduit, and to this end, turbochargers typically include a waste gate valve 30 (FIGS. 2 and 3) arranged in a bypass passage 31 (FIG. 3) defined by the turbine housing. The bypass passage connects between the chamber 26 and the discharge bore of the turbine housing downstream of the turbine wheel. Thus, when the waste gate valve is opened, some of the exhaust gas passes through the valve and thereby bypasses the turbine wheel.

With reference to FIGS. 1 and 2, regulation of the waste gate valve 30 is accomplished by an actuator 40 connected to the valve via a kinematic linkage arrangement comprising a first crank C1, a linkage L, and a second crank C2. The valve 30 has a rotary valve shaft 32, and one end of the first crank C1 is rigidly affixed to the valve shaft. The actuator 40 has a rotary output shaft 42, and one end of the second crank C2 is rigidly affixed to the output shaft. A first end of the linkage L is rotatably coupled to the first crank C1, and the opposite second end of the linkage is rotatably coupled to the second crank C2. To this end, the first crank includes a first pin P1 mounted adjacent an opposite end of the crank from the end affixed to the valve shaft 32. The corresponding end of the linkage L defines a through bore that receives the pin P1, and a retaining ring 50 captively connects the linkage to the pin in a manner described below. Similarly, the other end of the linkage defines a through bore that receives the second pin P2, and a retaining ring 150 captively connects the linkage to the second pin. Similar structures can be used for both retaining rings 50 and 150, and therefore the remaining description will focus only on the ring 50 for brevity.

The installation of the retaining ring 50 in the end of the linkage L is now explained with reference to FIGS. 4A-F. As noted, the first end of the linkage defines a through bore B1. The inner surface of the bore defines a circular linkage groove LG encircling the central axis of the bore. The retaining ring 50 comprises an elastically deformable wire that is formed into a generally polygonal shape that is non-closed, i.e., a gap G (FIG. 4C) remains between the opposite ends of the wire. The radial depth and the axial length of the linkage groove are sized in relation to the diameter of the wire so that portions of the wire can be received into the linkage groove.

Figure 4A:
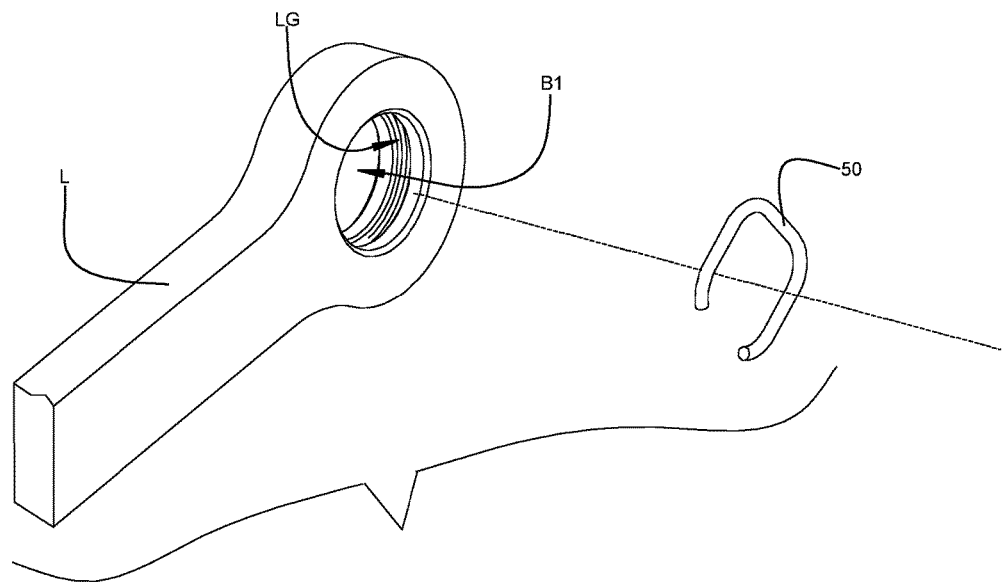
FIG. 4A is an exploded view showing an end portion of the linkage and the retaining ring.
Figure 4B:
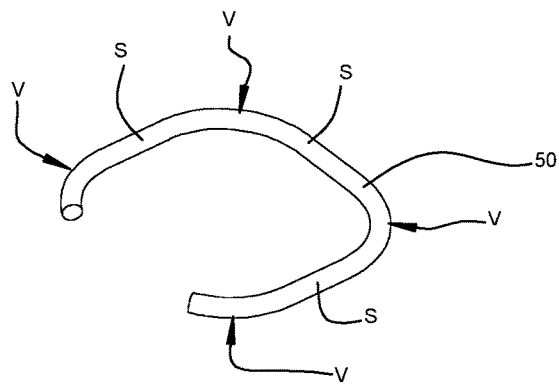
FIG. 4B is an isometric view of the retaining ring in accordance with one embodiment.
Figure 4C:
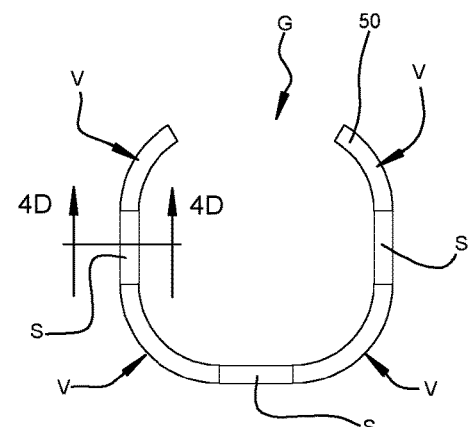
FIG. 4C is a plan view of the retaining ring of FIG. 4B.
Figure 4D:
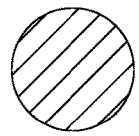
FIG. 4D is a cross-sectional view through the wire of the retaining ring of FIG. 4C.
Figure 4D:
Figure 4D:
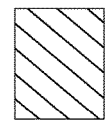
Figure 4E:
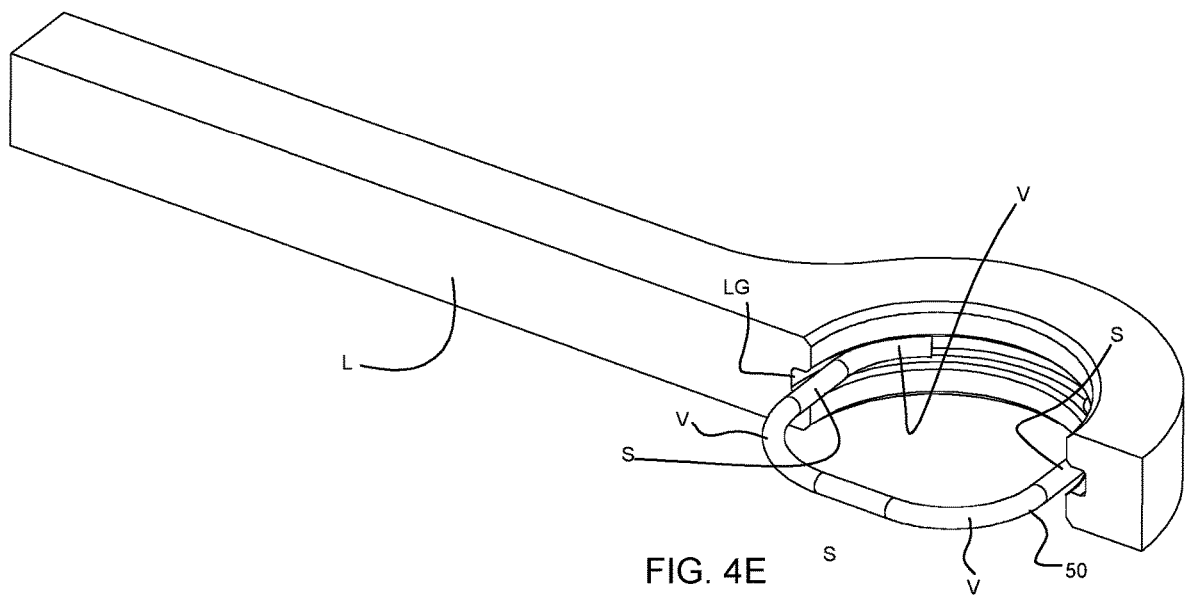
FIG. 4E is an isometric view of an end portion of the linkage with the retaining ring installed in its linkage groove, the linkage having been sectioned lengthwise to more clearly show the engagement of the retaining ring in the linkage groove.

With particular reference to FIGS. 4B and 4C, the retaining ring 50 is formed from elastically deformable wire by any suitable process such as a rolling process as commonly used for rolling springs and the like. The ring is formed to have a plurality of vertices and a plurality of sides each of which extends between two of said vertices. In the embodiment of FIGS. 4A-F, the retaining ring is generally rectangular, having four vertices V and three sides S. The gap G occupies most of what would be the fourth side of the rectangle. The terms "vertex" and "vertices" do not require or imply that they must be sharp corners, which in practice would be impossible, it always being necessary to have a non-zero radius of curvature of the wire at each vertex. Also, the term "side" does not require or imply that the sides must be linear, although linear sides can be used as shown in the drawings. Providing the retaining ring with vertices and sides enables the vertices of the ring to be engaged in the linkage groove while the sides remain radially inward of the radially outer wall of the linkage groove, as best seen in FIG.

Figure 4F:
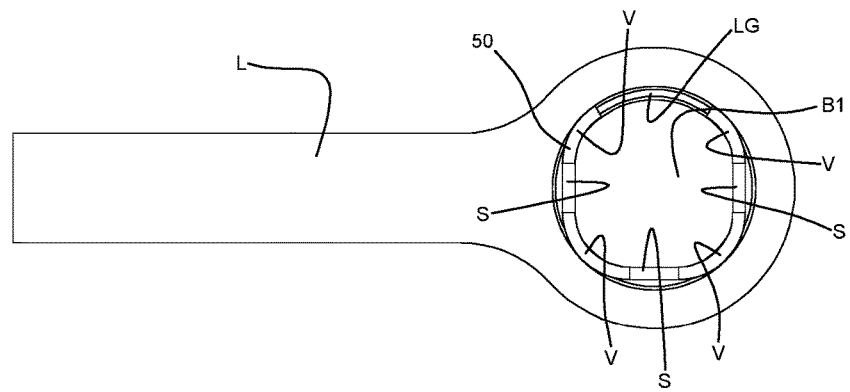
FIG. 4F is a plan view of the end portion of the linkage having the retaining ring in accordance with one embodiment installed therein.

4F. Advantageously, the retaining ring 50 is pre-installed in the linkage as shown in FIG. 4F, prior to connection to the pin of the crank C1, which will now be described with reference to FIGS. 5 through 7B.

Figure 5:
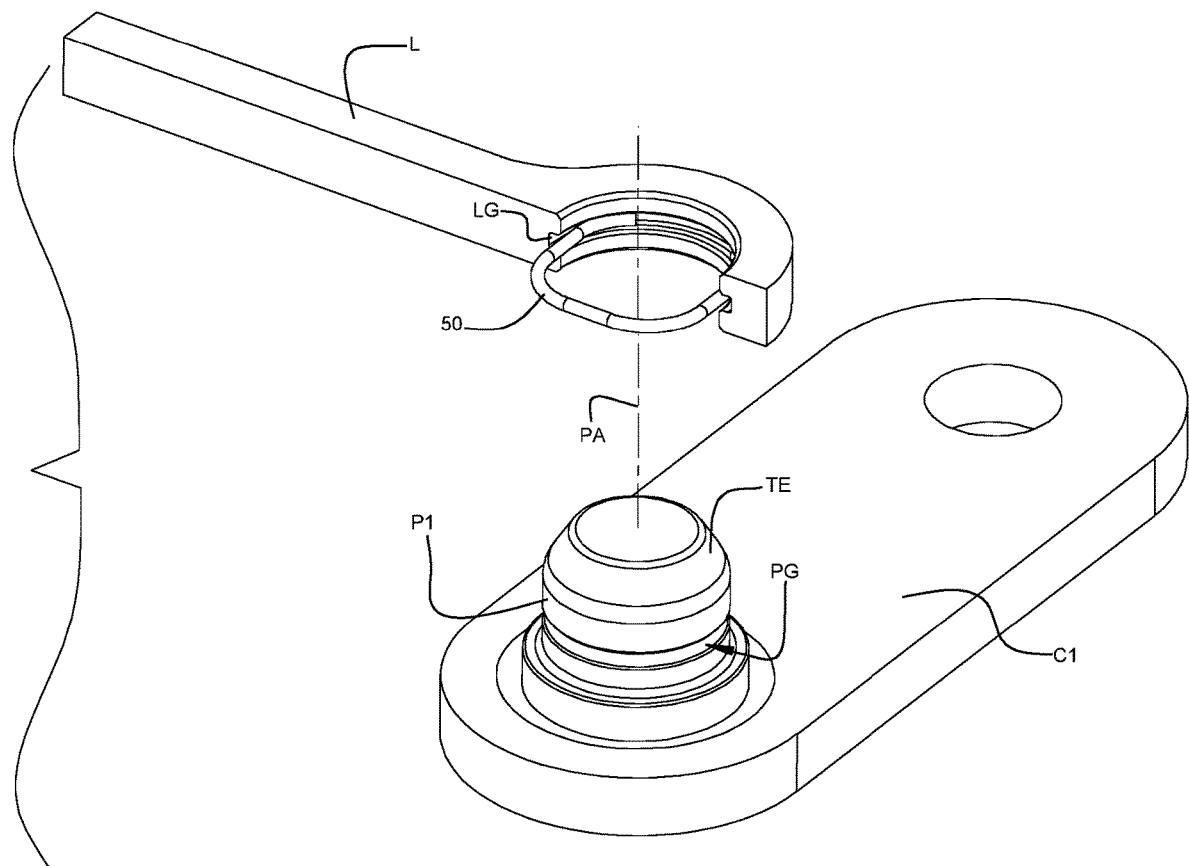
FIG. 5 is an exploded view showing the linkage (sectioned lengthwise to show the engagement of the retaining ring in the linkage groove) with the retaining ring pre-installed therein, ready to be pushed onto the pin of the crank.
Figure 6A:
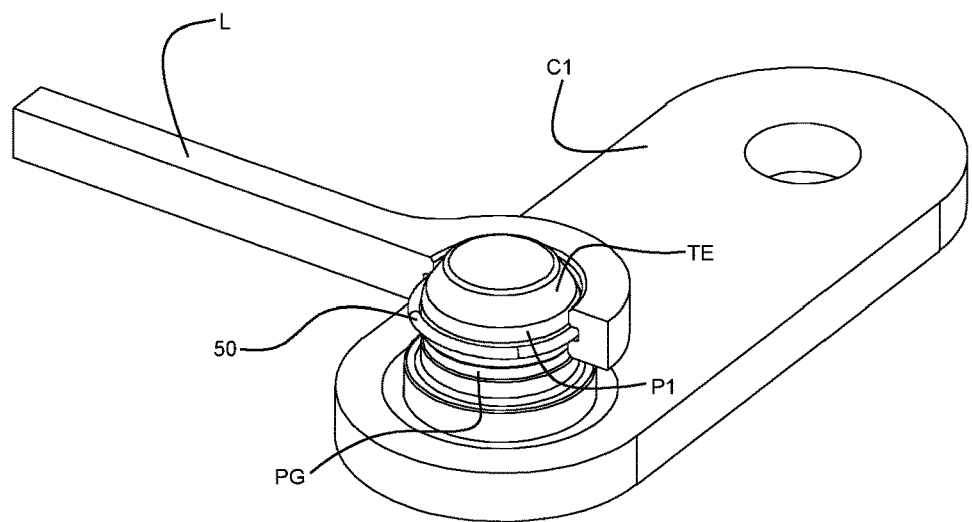
FIG. 6A illustrates initiation of the push-to-connect process to connect the linkage to the pin, wherein the tapered end of the pin has expanded the retaining ring radially outwardly.
Figure 6B:
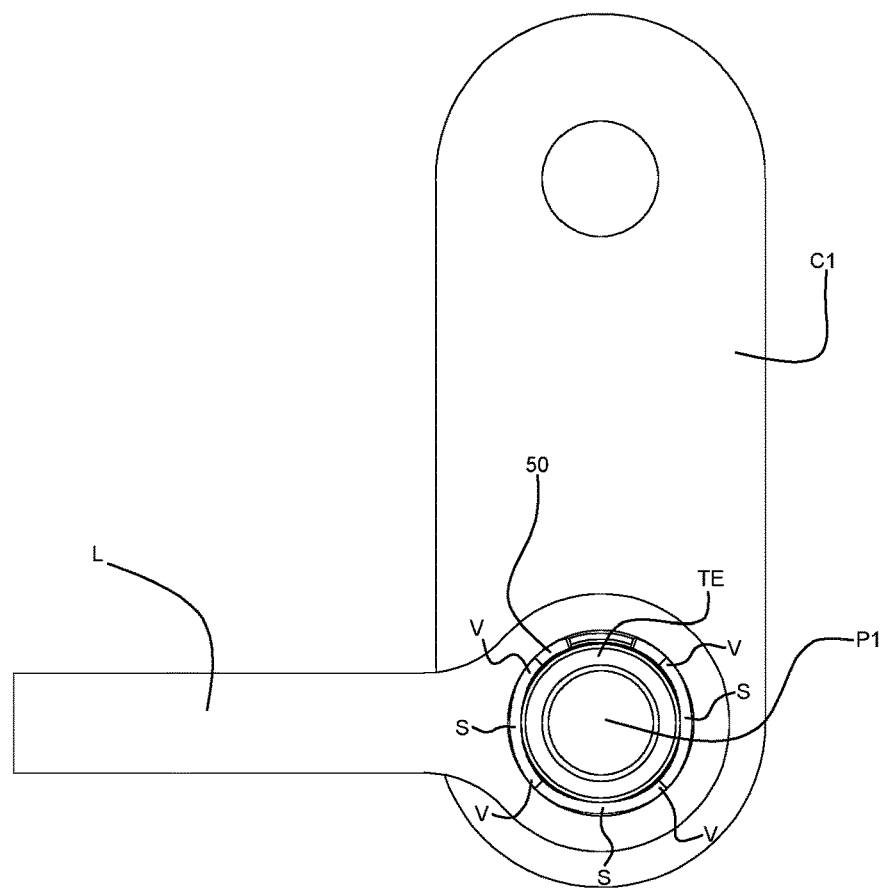
FIG. 6B is a top view corresponding to FIG. 6A.

As depicted in FIG. 5, the pin P1 of the first crank C1 extends along a pin axis PA and terminates at a distal end. The generally cylindrical outer surface of the pin defines a pin groove PG therein. The radial depth and axial length of the pin groove are selected in relation to the diameter of the wire forming the retaining ring. Distal of the pin groove, the pin defines a tapered end TE. Connection of the linkage having the pre-installed retaining ring to the pin of the crank is a simple push-to-connect process in which the tapered end of the pin contacts and urges the retaining ring to radially expand. More particularly, it is the sides S of the ring that are resiliently deformed radially outwardly (compare FIG. 4F before deformation by the pin, and FIG. 6B after deformation).

Figure 7A:
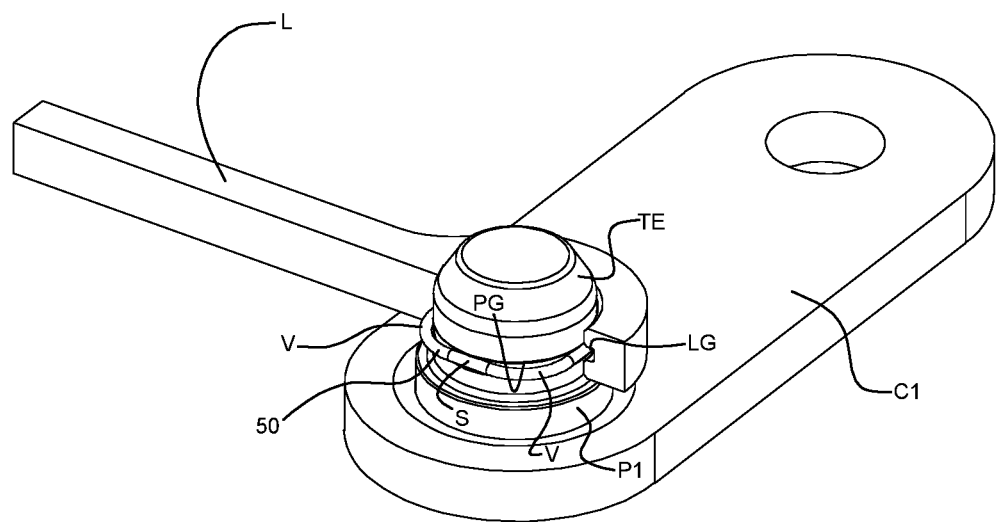
FIG. 7A illustrates a later time in the push-to-connect process when the linkage groove has become aligned with the pin groove and the retaining ring has contracted radially inwardly so that portions of its sides are within the pin groove.
Figure 7B:
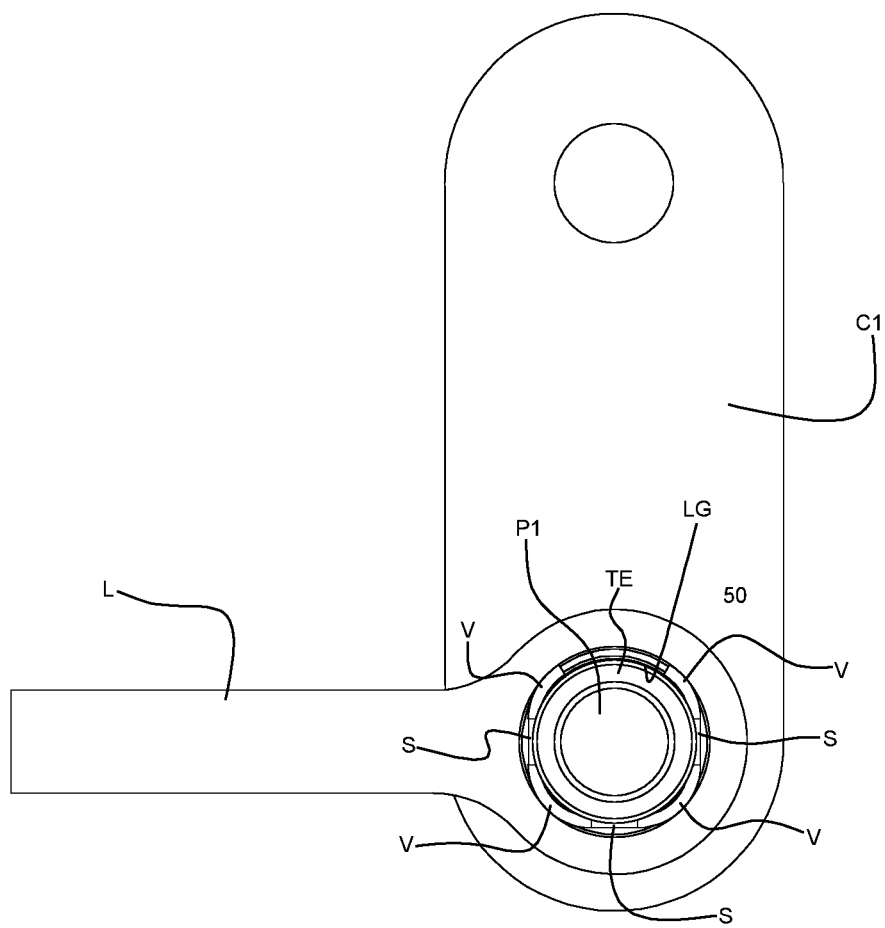
FIG. 7B is a top view corresponding to FIG. 7A.

Pushing the linkage further onto the pin then will cause the linkage groove LG to become aligned with the pin groove PG as best seen in FIG. 7A. Once these grooves become aligned, the retaining ring 50 resiliently returns toward its relaxed state, under the restoring force of the wire, and as a result, the sides S of the ring become engaged in the pin groove PG of the pin. At the same time, the vertices V of the retaining ring are engaged in the linkage groove LG as depicted in FIG. 7B. The retaining ring thus captively retains the linkage in connection with the pin to restrain axial movement of the linkage along the pin axis, while allowing the linkage to rotate relative to the pin about the pin axis.

Figure 8A:
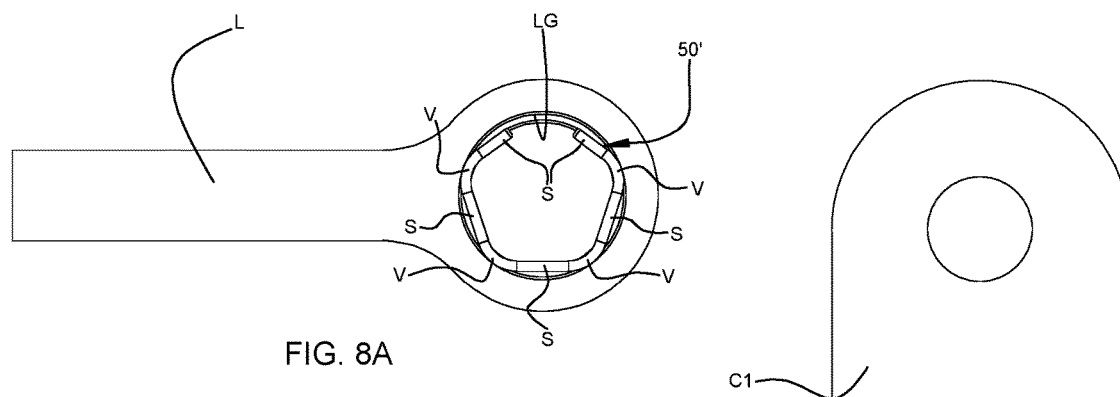
FIG. 8A is a top view corresponding to FIG. 4F, showing a second embodiment of the invention having a retaining ring of a different configuration.
Figure 8B:
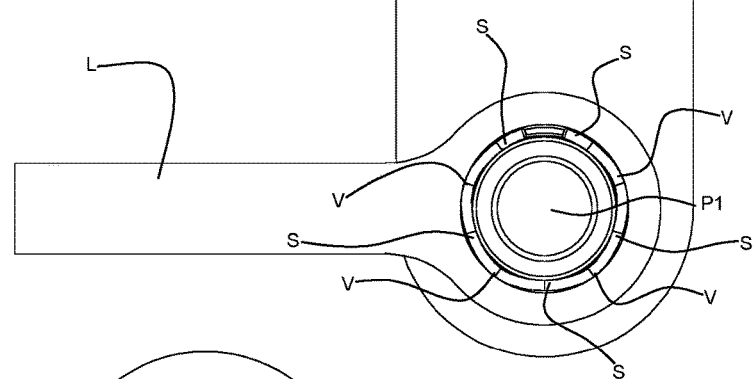
FIG. 8B illustrates initiation of the push-to-connect process for the second embodiment to connect the linkage to the pin, wherein the tapered end of the pin has expanded the retaining ring radially outwardly.
Figure 8C:
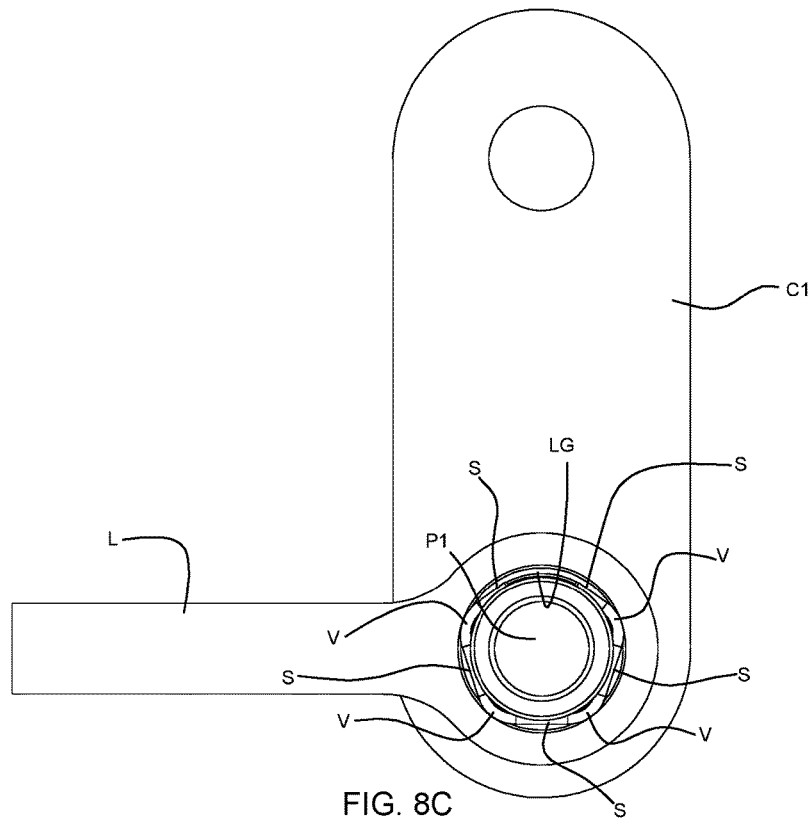
FIG. 8C illustrates a later time in the push-to-connect process for the second embodiment when the linkage groove has become aligned with the pin groove and the retaining ring has contracted radially inwardly so that portions of its sides are within the pin groove.

FIGS. 8A-8C illustrate a second embodiment of the invention in which the retaining ring 50' has a generally pentagonal configuration. As seen in FIG. 8A in which the retaining ring is pre-installed in the linkage groove LG of the linkage L (and in that state is relaxed or only slightly compressed radially inwardly by the outer wall of the groove), the retaining ring of the second embodiment is formed substantially as a pentagon, but in a non-closed form. A pentagon has five sides and five vertices, but the retaining ring 50' has five sides S and only four vertices V because what would have been the fifth vertex is occupied by the gap between the ends of the wire. The retaining ring 50' functions substantially like the retaining ring 50 of the first embodiment. The tapered end TE of the pin expands the sides of the retaining ring radially outwardly as the linkage is pushed onto the pin, and once the linkage groove LG becomes aligned with the pin groove PG, the sides return toward their original configuration and the ring's vertices V are engaged in the linkage groove while the sides S are engaged in the pin groove.

Figure 9A:
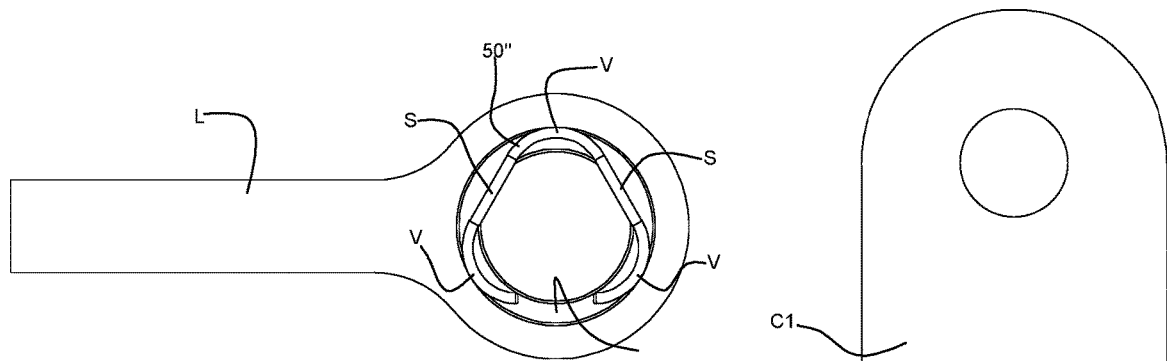
FIGS. 9A, 9B, and 9C correspond to FIGS. 8A, 8B, and 8C, respectively, but for a third embodiment of retaining ring in accordance with the invention.
Figure 9B:
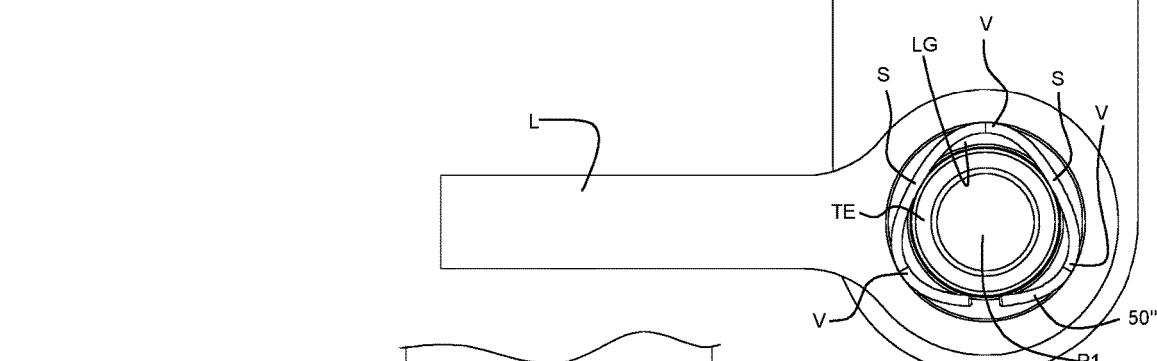
Figure 9C:
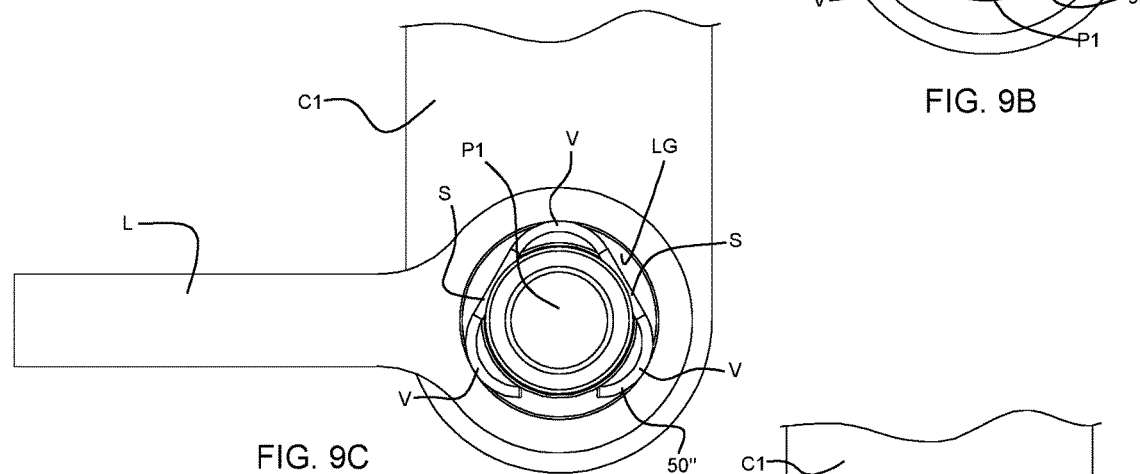

FIGS. 9A-9C depict a third embodiment of the invention having a retaining ring 50" with a substantially triangular configuration having three vertices V and three sides S, but one of the sides is interrupted by the gap between the ends of the wire, and therefore only two sides are engaged in the pin groove when the connection is made. The retaining ring 50" functions substantially like the retaining rings of the previous embodiments. The tapered end TE of the pin expands the sides of the retaining ring radially outwardly as the linkage is pushed onto the pin, and once the linkage groove LG becomes aligned with the pin groove PG, the retaining ring returns toward its original configuration and the ring's vertices V are engaged in the linkage groove while the sides S are engaged in the pin groove.

Figure 9D:
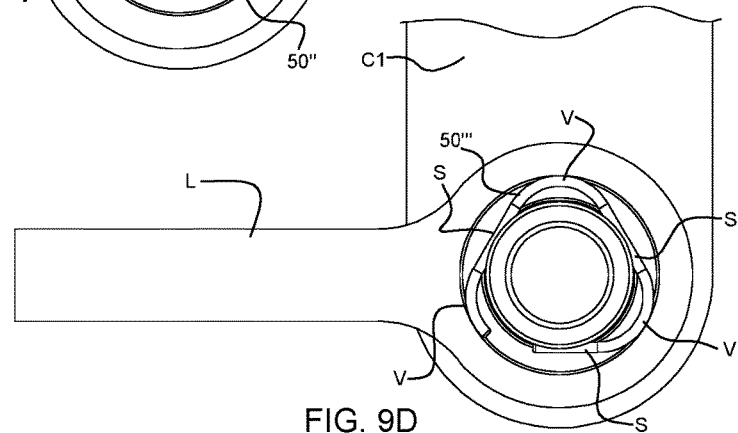
FIG. 9D illustrates a fourth embodiment of retaining ring in accordance with the invention.

FIG. 9D illustrates a fourth embodiment of retaining ring 50''' that is substantially triangular as in the third embodiment, but the gap between the ends of the wire begins right at the apex of one vertex V. This allows the ring to have three sides S that are engaged in the pin groove upon connection of the linkage to the pin.

Persons skilled in the art, on the basis of the present disclosure, will recognize that modifications and other embodiments of the inventions described herein can be made without departing from the inventive concepts described herein. For example, although retaining rings with three and four vertices have been described, the invention is not so limited; rings with five or more vertices can be used. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A crank and linkage assembly for a turbocharger, comprising:
    a first crank having a cylindrical first pin extending therefrom along a first pin axis and terminating at a distal end of the first pin, an outer surface of the first pin defining a circular first pin groove therein encircling the first pin axis, the first pin groove being spaced along the first pin axis from the first crank;
    a linkage comprising an elongate member and extending from a first end to a second end, the linkage defining a first through bore adjacent the first end and a second through bore adjacent the second end, an inner surface of the first through bore defining a circular first linkage groove therein, a lengthwise portion of the first pin being disposed within the first through bore of the linkage such that the first linkage groove is aligned with the first pin groove; and
    a first retaining ring comprising an elastically deformable wire formed into a generally polygonal non-closed configuration such that the first retaining ring defines a plurality of vertices and a plurality of sides, wherein each of said plurality of vertices is within the first linkage groove and at least two of the plurality of sides has a portion engaged in the first pin groove, thereby restraining movement of the first end of the linkage along the first pin axis while allowing rotational movement of the linkage about the first pin axis.

2. The crank and linkage assembly for a turbocharger of claim 1, wherein the first retaining ring defines two sides engaged in the pin groove.

3. The crank and linkage assembly for a turbocharger of claim 1, wherein the first retaining ring defines three sides engaged in the pin groove.

4. The crank and linkage assembly of claim 1, wherein the first retaining ring defines three vertices.

5. The crank and linkage assembly of claim 1, wherein the first retaining ring defines four vertices.

6. The crank and linkage assembly for a turbocharger of claim 1, wherein an inner surface of the second through bore of the linkage defines a circular second linkage groove therein, and further comprising:
    a second crank having a cylindrical second pin extending therefrom along a second pin axis and terminating at a distal end of the second pin, an outer surface of the second pin defining a circular second pin groove therein encircling the second pin axis, the second pin groove being spaced along the second pin axis from the second crank, a lengthwise portion of the second pin being disposed within the second through bore of the linkage such that the second linkage groove is aligned with the second pin groove; and a second retaining ring comprising an elastically deformable wire formed into a generally polygonal non-closed configuration such that the second retaining ring defines a plurality of vertices and a plurality of sides, wherein each of said plurality of vertices of the second retaining ring is within the second linkage groove and at least two of the plurality of sides has a portion engaged in the second pin groove, thereby restraining movement of the second end of the linkage along the second pin axis while allowing rotational movement of the linkage about the second pin axis.

7. The crank and linkage assembly for a turbocharger of claim 1, wherein the wire forming the first retaining clip has a round cross-section.

8. The crank and linkage assembly for a turbocharger of claim 1, wherein the wire forming the first retaining clip has an oval cross-section.

9. The crank and linkage assembly for a turbocharger of claim 1, wherein the wire forming the first retaining clip has a rectangular cross-section.

10. A method for assembling a crank and linkage assembly, comprising the steps of:
 (a) providing a crank having a cylindrical pin extending therefrom along a pin axis and terminating at a distal end of the pin, an outer surface of the pin defining a circular pin groove therein encircling the pin axis, the pin groove being spaced along the pin axis from the crank, the pin, distal of the pin groove, comprising a tapered end;
 (b) providing a linkage comprising an elongate member, the linkage defining a through bore adjacent an end of the linkage, an inner surface of the through bore defining a circular linkage groove therein;
 (c) providing a retaining ring comprising an elastically deformable wire formed into a generally polygonal non-closed configuration such that the retaining ring defines a plurality of vertices and a plurality of sides;
 (d) installing the retaining ring in the linkage groove such that each of said plurality of vertices is within the linkage groove; and
 (e) after completion of step (d), inserting the tapered end of the pin into the through bore of the linkage to cause the tapered end to elastically deform said plurality of sides of the retaining ring radially outwardly, whereupon once the pin groove is aligned with the linkage groove, the plurality of sides of the retaining ring move radially inwardly, by elastic restoring force of the wire, such that at least two of the plurality of sides have portions engaged in the pin groove.

\* \* \* \* \*